Patented June 7, 1927.

1,631,730

UNITED STATES PATENT OFFICE.

JOSEPH A. JEFFERY AND EARLE T. MONTGOMERY, OF DETROIT, MICHIGAN, ASSIGNORS, BY MESNE ASSIGNMENTS, TO CHAMPION PORCELAIN COMPANY, OF DETROIT, MICHIGAN, A CORPORATION OF MICHIGAN.

CERAMIC MATERIAL.

No Drawing. Application filed May 24, 1919. Serial No. 299,574.

Our invention relates to the production of ceramic material and the raw batch thereof. The invention particularly has for its object to provide a ceramic insulating material of the porcelain type, which has high electrical resistance at atmospheric temperatures and at all higher temperatures up to a bright red heat and at the same time possesses the following additional valuable properties:—An exceptionally high mechanical strength, a vitreous structure throughout the mass, a low coefficient of thermal expansion, a high specific gravity, a high modulus of elasticity, a high thermal conductivity, a low specific heat and maximum physical and chemical homogeneity. By reason of these properties the articles composed of our material are exceedingly valuable when used as insulators under conditions where a considerable resistance to impact, compression, tension, vibration, and other mechanical strains; imperviousness to liquids and gases; and resistance to sudden temperature changes, are required. Our invention thus provides a ceramic material to be used for a wide variety of purposes, but particularly is the invention of value when applied to insulators for the spark plugs used in internal combustion engines, which require a high hot dielectric strength, a high mechanical strength, a high thermal diffusivity, and a low coefficient of thermal expansion to efficiently perform their functions.

We obtain a material having the desired characteristics, first, by using the alkaline earth metal oxides as the principal fluxes, introduced through definite, hard calcined, vitrified or fused minerals, or through hard calcined, vitrified or fused synthetic compounds as sources; second, by using, in compounding the body batch, one or more chemically and mineralogically definite and stable raw constituents, or one or more chemically and mineralogically definite, hard calcined, vitrified or fused natural constituents, or one or more chemically and mineralogically definite, hard calcined, vitrified or fused synthetic constituents prepared by prefiring, of such chemical compositions and in such proportions, with the minimum amount of raw clays consisting of kaolin alone or a mixture of kaolin and ball clays which are necessary for plasticity and practical working properties, that on firing the body to the required temperature to vitrify the mass, definite end products are formed containing a large amount of sillimanite and which are practically in chemical and physical equilibria and of comparatively great density, both apparent and true.

The use of alkaline earth metal fluxes is particularly effective in raising the hot dielectric. The density of the materials introduced into the batch aids in producing a dense product having high heat diffusivity, while the fact that the natural or synthetic constituents are stable, or have a relatively low and uniform volumetric change under changing heat conditions aids in the retention of mechanical strength. Both the density and homogeniety of the end product are aided by the intimate association of fluxing ingredients with the other ingredients in the vitrified or fused natural or synthetic constituents. The development of sillimanite, which is likewise aided by the other characteristics of the batch mentioned, is an aid to mechanical strength, because the needle like crystals are bound into a strong mass, and their low and uniform thermal expansion avoids any disruption of the bond.

In technical works describing porcelains and similar materials, such as the article by Klein in Technical Paper No. 80 of the Bureau of Standards, the term "sillimanite" is applied to crystals in ceramic bodies having petrographic characteristics of natural sillimanite, and to the aluminum silicate, both amorphus and crystalline, which is formed when clay is dissociated by heat into excess alumina and an aluminum silicate higher in alumina than the original clay. In this application and in the appended claims, it will be understood that the term "sillimanite" is used to cover both the natural mineral and an artificial product as closely resembling the natural sillimanite as does the above mentioned silicate produced by the dissociation of clay.

The amount of hard calcined, vitrified or fused natural or synthetic constituents, or of dense, stable, hard natural minerals of the same physical characteristics, used, is governed by the use for which the product is intended and the properties, or their degrees, which it is desired to secure in the final product.

Where the hard calcined, vitrified or fused constituent is prepared synthetically, we prefer to introduce compounds containing alkaline earth metal oxides. These oxides may be introduced through the use of a number of different raw materials, such as magnesite or other magnesium carbonates, magnesium oxide, the hydroxide of magnesia, either the artificial hydrate or mineral hydrate brucite, talc, and other magnesium compounds yielding the oxide or a silicate on heating; whiting, or other calcium carbonates, calcium oxide, calcium hydroxide, and other calcium compounds yielding the oxide or a silicate on heating; dolomite or other mixed calcium and magnesium carbonates, dolomitic oxide, dolomitic hydrate and other mixed calcium and magnesium compounds yielding the oxides or silicates on heating; and beryllium, barium, strontium and other alkaline earth metal compounds yielding the oxide or a silicate on heating.

While both alkali and alkaline earth-metal oxides may be used as fluxes, the former, producing alkali-metal silicates in the resulting material upon firing, seriously reduce the dielectric strength at high temperatures of the final product, and increase its coefficient of thermal expansion. We therefore use the maximum amount of the oxides of the alkaline earth metals, or their equivalents, and the minimum amount of the oxides of the alkali metals or their equivalents, possible, in order to secure the requisite properties desired to be produced in the material resulting after firing, particularly as to the hot dielectric strength and resistance to sudden temperature changes. The exact proportion of one to the other will be governed by the use for which the final product is intended and the properties, or their degrees, which it is desired to secure in the article to be produced, and this proportion is particularly governed by the firing conditions commercially feasible in the ceramic art. The total amount of fluxing oxides used is determined by the chemical composition, and the amount, of a definite silicate selected to constitute the flux of the body batch.

In compounding the batch for the synthetic constituent, the raw materials are used in proportions calculated to produce, on firing to the proper temperature and for the proper length of time, a large amount of sillimanite. We have obtained good results by using the ingredients in such proportions that there are approximately equal molecular proportions of alumina and silica, that is, 102 parts of alumina to 60 parts of silica. In the table which we give below, kaolin and alumina are named as the sources of alumina and silica intended to form the sillimanite, but it will be understood that the alumina and silica may be introduced in the form of other compounds, and that, instead of the synthetic constituent, any suitable natural mineral, such as sillimanite, and alusite and cyanite or kyanite, may be used.

In compounding the body batch in its preferred form, preparatory to forming and firing the articles in their final shapes, we mix together approximately 60% of one or more synthetic calcines or natural minerals, such as described, and approximately 40% of materials, such as kaolin or kaolin and ball clay, which are needed for plasticity and general working properties in the batch. Additional flux is introduced, if desired. It will be understood that material other than clay may be added to the hard calcined, vitrified or fused synthetic or natural constituent, and that the proportion of the added clay or other material may be altered in accordance with desired results; but the materials are mixed in such proportions that on firing to the required temperature to thoroughly vitrify the mass, and allowing time for the pyrochemical reactions to reach completion, definite end products are formed, causing the resulting material to be practically in chemical and physical equilibria and of maximum density, both apparent and true.

If the requisite conditions in the final product after firing, as herein set forth, are secured, it is immaterial whether one or more than one calcine or natural mineral, or a mixture of calcines and natural minerals as discussed above, are used to make up the non-plastic portion of the body batch.

An example of a composition based on the principles just discussed and designed to produce the hereinafter stated requisite conditions in the final product is given in the following table:

| Raw batch for combined synthetic sillimanite and flux. Cone 18. | Batch for the body. Cone 17. |
|---|---|
| Kaolin ............................. 71.2 | Calcine ............................. 60.0 |
| $Al_2O_3 3H_2O$ ..................... 21.6 | Feldspar ............................ 3.0 |
| Talc ............................... 7.8 | Ball clay (raw) ..................... 7.0 |
|  | Kaolin (raw) ........................ 30.0 |
| 100.0 | 100.0 |

We find that this body batch when suitably prepared by the usual processes of milling, blunging and filterpressing, is plastic and may be worked and formed into the desired insulator shapes in preparation for the kiln, by any of the processes known to the art, and that upon the application of the raw glaze and firing in a kiln to a suitable temperature, the articles become exceptionally dense and strong mechanically, vitreous throughout the mass, impervious to liquids and gases and take a proper glaze. We find further that these bodies in the dry green state are, by virtue of the nature and amount of the non-plastic constituents used, dense, but lightly bonded and friable bodies, which are exceptionally rapid cutting by any means of dry-forming known to the art.

The proportions of the constituents, both raw and calcined, or of their equivalents, used in compounding the body batch may be varied in accordance with the principles specified above and yet such batch compositions and their end products will be within the scope of our invention. Variations in the amounts are used according to the properties, or their degrees, which are required in the resultant material of the product.

As indicated in the table, it is sometimes found necessary in commercial practice to introduce a small amount of alkali metal flux, such as feldspar, to control the crystallization of the sillimanite in the resultant material during firing and cooling. This feldspar may also be introduced through one of the other batch ingredients. On account of its detrimental effect on the resistivity at high temperatures as well as on other important properties of the body, it is used in the smallest amount possible, and may be entirely omitted where firing conditions warrant.

The non-plastic constituents, either natural or synthetic, of the body batch, are used as a means of controlling both the drying and firing shrinkage. They incidentally provide a means of securing high cutting speeds in dry-forming as mentioned above. These non-plastic constituents being themselves physically dense and homogeneous and of high specific gravity, produce, upon mixing with suitable proportions of raw plastic constituents and firing to a suitable temperature under proper conditions, a physically dense and homogeneous final product, vitreous throughout the mass, of high specific gravity, of exceptionally high mechanical strength, of a high modulus of elasticity, of a high thermal conductivity, of a low specific heat, and one which is practically in chemical and physical equilibria.

By controlling the chemical and mineralogical composition of the body batch there is produced in the final product after firing, the following requisite conditions:—1. A maximum amount of sillimanite and a minimum amount of glassy matrix. 2. Alkaline earth-metal-silicates in excess of alkali metal silicates in the glassy matrix. 3. No free silica, i. e. practically no silica in crystal form but rather in combination or in solution. 4. No excess constituent or element which has not entered into combination or solution. 5. No elements or compounds in unstable form, or ones which will become unstable within the temperature range of the commercial use of the product. 6. Maximum chemical and physical equilibria. 7. Maximum density, both apparent and specific.

This chemical control, therefore, results in a chemical composition which, coupled with the above stated physical properties, gives a final product having also, in the highest degree, the properties of high dielectric strength, or resistivity, at high temperatures up to a bright red heat, and a minimum coefficient of thermal expansion.

Obviously, for uses where porosity is not objectionable, or even desirable, the other properties mentioned may be retained to a considerable degree by varying the flux and the firing so that the apparent density may not be maximum, although the true density may be high; and likewise, where other particular properties, such as high hot dielectric, are not desired, the composition may be varied so that it does not retain this property while retaining other desirable properties and coming within the scope of some of the appended claims.

In order to obviate prolixity in the claims, we have specified in some parts of the specification and in some of the claims a single compound of a particular class but it is to be understood that the claim covers and comprehends in each case one or more compounds of that class whether naturally or artificially formed, and that we may use a plurality of compounds of the class named and yet be operating within the scope of the claim in question. The term "heat-formed constituent" as used in the claims is intended to cover both natural and artificial materials.

We claim,—

1. A batch for ceramic material comprising a material amount of a heat-formed constituent containing alumina, silica and a flux, the proportion of alumina to silica in said constituent being nearer their proportion in sillimanite than is their proportion in clay.

2. A batch for ceramic material comprising a heat-formed constituent containing alumina, silica and an alkaline earth metal flux, the percentage of alumina in said constituent being higher than it is in clay.

3. A batch for ceramic material comprising a heat-formed constituent containing a flux compound, and more than 70% of the remainder of said constituent being sillimanite.

4. A batch for ceramic material containing as one of its ingredients, a combination of flux, alumina, and silica, the alumina and silica in said constituent, aside from the flux, being in approximately the proportion of 102 parts of alumina to 60 parts of silica.

5. A batch for ceramic material at least 60% of which consists of a heat-formed constituent containing flux, alumina and silica, the proportion of alumina to silica in the constituent being nearer their proportion in sillimanite than is their proportion in clay.

6. A batch for ceramic material, at least 60% of which consists of a heat-formed constituent containing a flux and at least 75% of the remainder of the constituent being sillimanite.

7. A batch for ceramic material having as an essential ingredient a heat-formed constituent consisting of sillimanite and a glassy matrix containing a flux.

8. The raw batch of a ceramic material comprising a mixture of raw clay and a synthetic silicate comprising sillimanite and an alkaline earth metal compound.

9. A batch for ceramic material comprising clay and a heat-formed constituent, said constituent consisting of sillimanite and a glassy matrix containing a flux.

10. The method of making a ceramic product which consists in forming a batch containing alumina and silica in a form other than sillimanite and a heat-formed constituent comprising sillimanite and a flux, and firing the batch to produce the largest practicable amount of sillimanite from the batch.

11. The method of making a ceramic product, which consists in forming a batch comprising clay and a heat-formed constituent containing sillimanite and an alkaline earth metal flux, and firing the batch to produce additional sillimanite from the clay.

12. The method of making a ceramic product which consists in forming synthetically a compound of sillimanite and a flux, mixing it with raw clay and firing the mixture until it consists of sillimanite and a glassy matrix.

In testimony whereof we have hereunto signed our names to this specification.

JOSEPH A. JEFFERY.
EARLE T. MONTGOMERY.